United States Patent [19]

Holly

[11] Patent Number: 4,630,234

[45] Date of Patent: Dec. 16, 1986

[54] LINKED LIST SEARCH PROCESSOR

[75] Inventor: James R. Holly, San Diego, Calif.

[73] Assignee: GTI Corporation, San Diego, Calif.

[21] Appl. No.: 483,545

[22] Filed: Apr. 11, 1983

[51] Int. Cl.[4] .............................................. G06F 3/14
[52] U.S. Cl. ................................................... 364/900
[58] Field of Search ....................... 364/200, 900, 300; 340/703

[56] References Cited

U.S. PATENT DOCUMENTS

| | | | |
|---|---|---|---|
| 3,388,381 | 6/1968 | Prywes et al. | 364/200 |
| 3,729,712 | 4/1973 | Glassman | 364/900 |
| 3,905,045 | 9/1975 | Nickel | 364/300 |
| 3,972,026 | 7/1976 | Waitman et al. | 364/900 |
| 4,074,254 | 2/1978 | Belser et al. | 364/900 |
| 4,439,759 | 3/1984 | Fleming et al. | 340/703 |
| 4,468,728 | 8/1984 | Wang | 364/200 |

Primary Examiner—Gareth D. Shaw
Assistant Examiner—Daniel K. Dorsey
Attorney, Agent, or Firm—Morland C. Fischer

[57] ABSTRACT

A relatively low cost, high speed search processor for efficiently scanning, inserting, and clearing certain data in an ordered linked list of data regarding a plurality of video scan line segments, which segments define mathematical elements (e.g. polygons) and corresponding portions of a three dimensional image. Data items containing information regarding the starting coordinates of the segments of a scan line are encoded and stored in the linked list according to the magnitudes thereof. The present search processor is adapted to read a new data entry to the linked list which is representative of the magnitude of a scan line segment starting coordinate and rapidly search the existing data items of the linked list to determine a particular location in the list at which to insert the new data entry, depending upon the magnitude of the scan line segment starting coordinate thereof relative to the magnitudes of the respective scan line segment starting coordinates of other items in the list.

10 Claims, 13 Drawing Figures

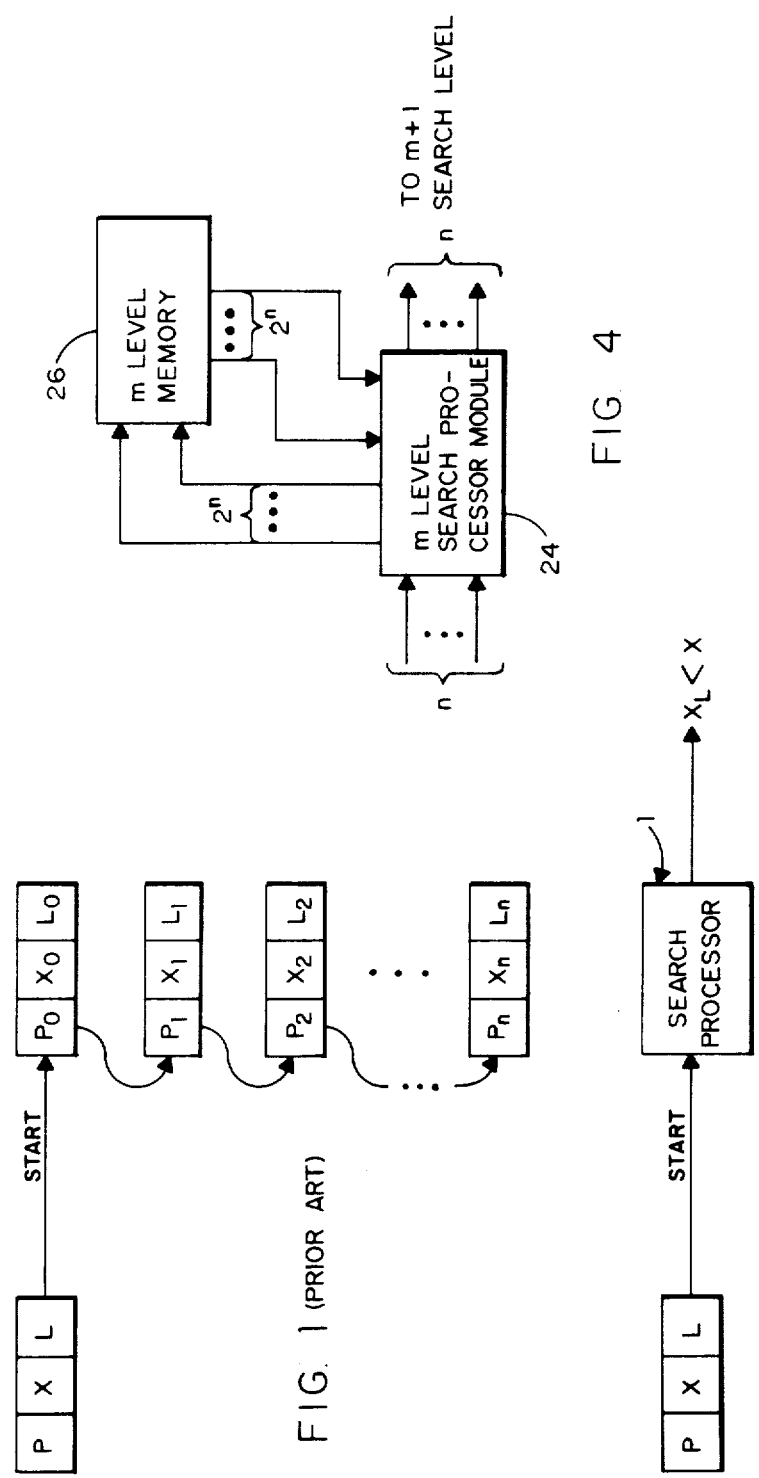

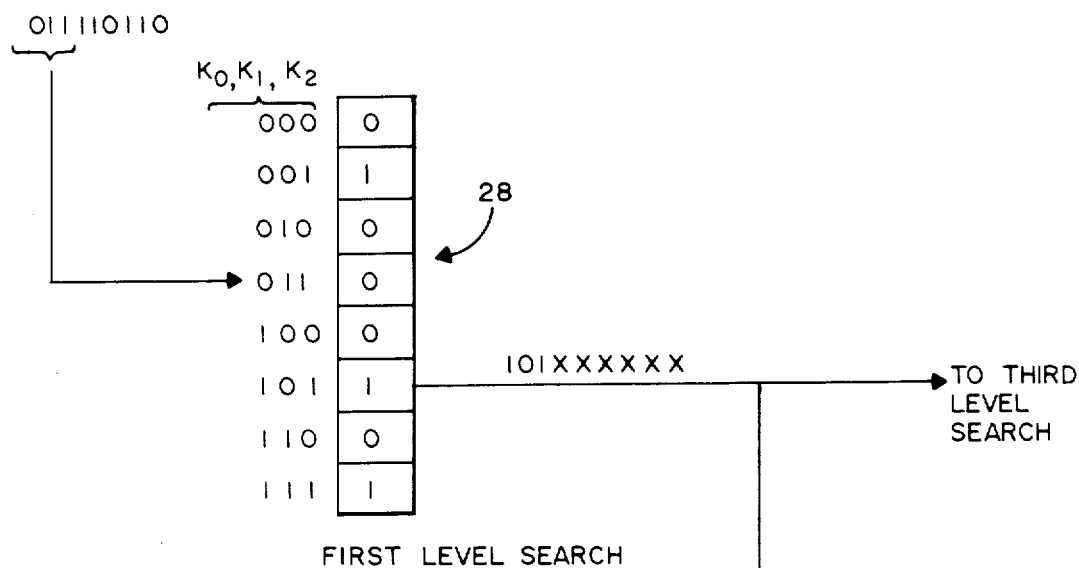
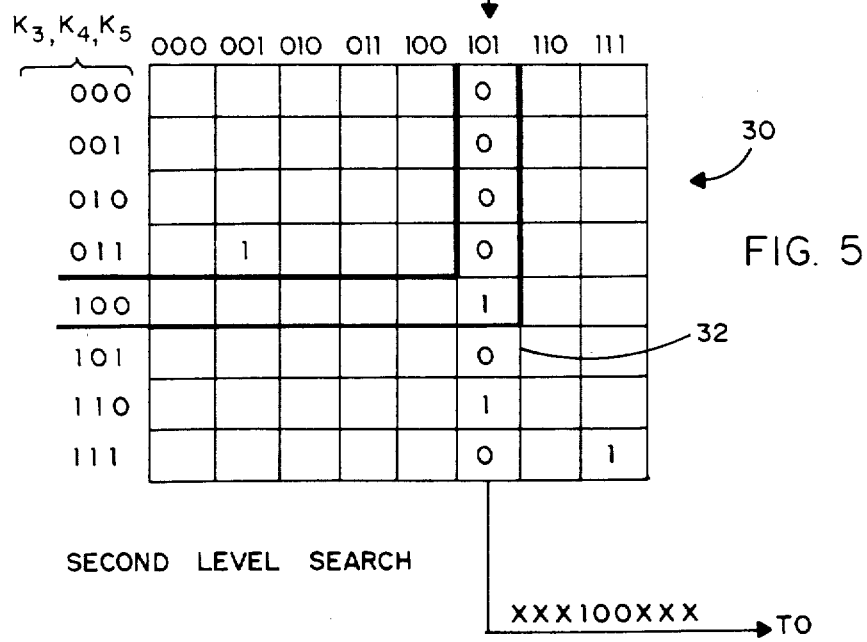
FIG. 5
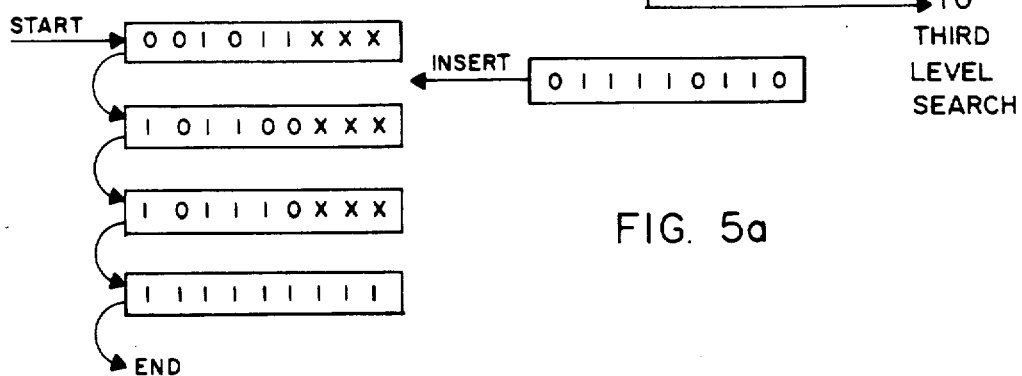
FIG. 5a

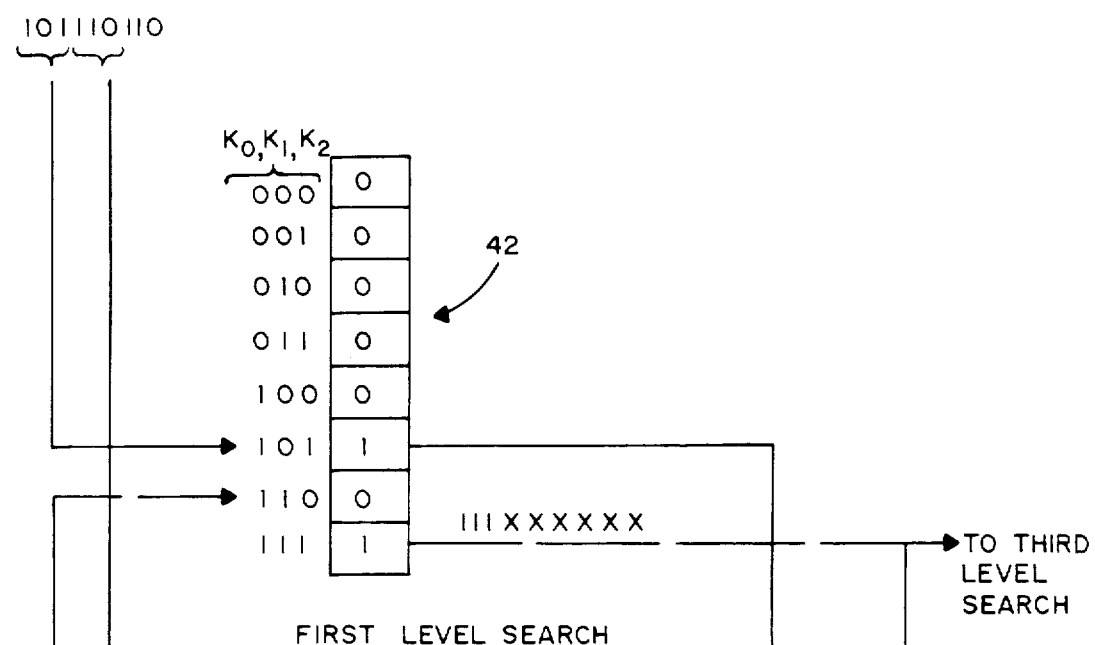
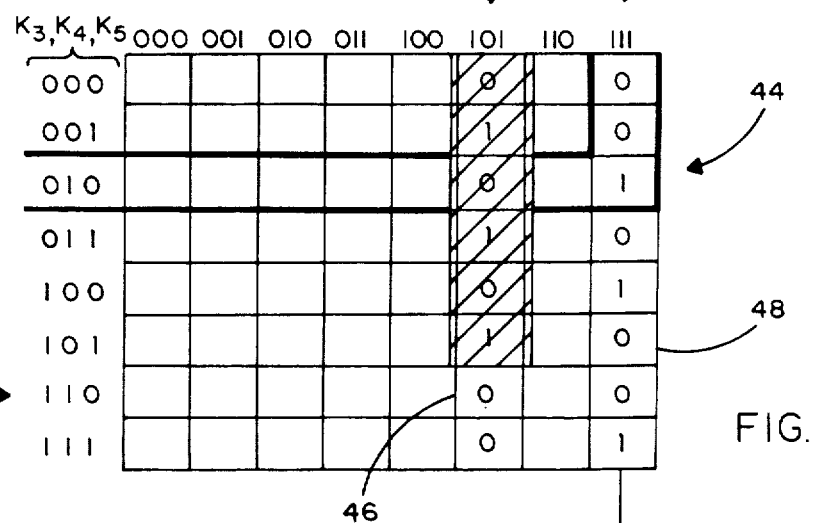
FIG. 7
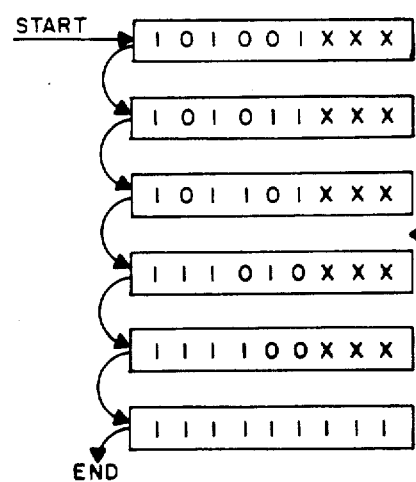
FIG. 7a

LINKED LIST SEARCH PROCESSOR

BACKGROUND OF THE INVENTION

The present invention relates to a high speed, relatively low cost search processor for rapidly and efficiently searching an ordered linked list of data items on the basis of a search argument which is representative of the magnitude of a new data entry to be selectively inserted into a linked list. The new linked list search processor has particular application to a real time, computer grahics system or to a higher performance, special purpose computer generated imagery system adapted to produce realistic pictures of three dimensional objects on a video display. Briefly, and in general terms, computer graphics systems are presently known which are able to process full color perspective views of objects and scenes by incorporating therein a hidden surface algorithm with variable intensity shading, so that a realistic image or scene may be accurately portrayed. Such computer graphics systems are capable of several different applications including, but not limited to, flight simulation techniques, computer aided design, architectural planning, and mathematical modeling.

However, computer generated imagery systems of the prior art in which real time performance capabilities are incorporated (i.e. those which are adapted to generate at least 30 picture frames per second) generally include an array of hardware components and microelectronic devices which are arranged to form a system that has proven both costly to implement and relatively difficult to use. Moreover, the enormous computation rate that is needed to generate video data at a rate approaching real time also frequently requires a multitude of relatively expensive, high speed hardware components.

As will be known to those skilled in the art, conventional computer generated imagery or graphics systems are capable of displaying pictures of three dimensional objects, which objects are typically defined by a plurality of mathematical elements, such as polygons, surface patches, and other higher order surfaces. That is, stored computer data is used to generate an array of scan lines, with a particular array of such scan lines defining a polygon, or the like. More particularly, each scan line has a length of several pixels which, when displayed, may represent part of one or more polygons. The alignment of pluralities of successive scan lines forms a picture to be displayed.

Data, which is representative of a compilation of information regarding segments which form a respective scan line and, accordingly, portions of one or more respective polygons, is stored in the form of an ordered or linked list in a computer memory. Such data items of the linked list include the length and starting coordinate of each scan line segment as well as a pointer to direct a processor unit to the next successive entry in the list. According to conventional techniques, the information content of the linked list is searched sequentially via a path that is mapped out by the pointers of successive data items, so that, eventually, a new data entry containing information regarding a scan line segment can be properly added to and combined with existing data items of the list in such a prescribed order so as to form a complete scan line when the data is assembled and displayed. In other words, when each new data entry containing information regarding a scan line segment is read, a processing unit sequentially searches through the linked list of data items to determine the precise location for the new scan line segment, depending upon the magnitude of the starting coordinate thereof relative to the magnitudes of the starting coordinates of all other data items in the list.

As will be known to those skilled in the art, the sequential scanning of the data items in a linked list increases the processing time and the throughput delay before a scan line can be assembled and ultimately displayed. Consequently, when the linked list is particularly long or when the number of scan lines is relatively large, the inherent time delay in such a prior art system is undesirably maximized. Moreover, the processing equipment for performing the sequential scan of a linked list is undesirably complex and further contributes to the overall high cost of conventional computer graphics and computer generated imagery systems.

By way of example, one prior art technique for locating and identifying one of a plurality of stored data items on the basis of complex searching conditions (e.g. including equality, magnitude, and the like) is a content-addressable memory used in a parallel processor. Such a memory is conceptually described in the book CONTENT-ADDRESSABLE MEMORIES by Teuvo Kohonen, Springer-Verlag, ed., 1980, Section 3.4.5, pp. 158-161.

International patent application No. PCT/US81/233 describes a vector memory means and means for positioning line segments in a graphics display system according to the starting coordinate values of the segments.

Some other documents which describe a computer graphics system having means for arranging and displaying video data are identified below:

| U.S. Pat. No. | Issue Date |
|---|---|
| 3,925,776 | December 9, 1975 |
| 3,944,997 | March 16, 1976 |
| 4,233,601 | November 11, 1980 |
| 4,241,341 | December 23, 1980 |
| 4,364,037 | December 14, 1982 |

SUMMARY OF THE INVENTION

Accordingly, it is primary object of the present invention to provide a unique linked list search processor that has particular application for scanning, setting, and clearing information stored in an ordered linked list of a computer generated imagery or graphics system for the purpose of assembling and displaying real time, three dimensional images.

It is another important object of this invention that the present linked list search processor be of relatively low cost, whereby to minimize the overall cost of the computer generated imagery or graphics system.

It is yet another important object of this invention that the present linked list processor be of relatively high speed, whereby to both maximize efficiency and minimize the inherent throughout delay for reading, assembling, and displaying information in the form of a real time, three dimensional image.

It is still another important object of this invention that the present linked list search processor be capable of reading a search argument corresponding to a condition of a new data entry to be inserted into the linked list and rapidly searching the existing data items of the list to determine a particular location within the list at which to insert the new data entry, depending upon the respective condition of the existing data items.

It is further object of this invention that the resultant field of the present linked list search processor be a binary encoded representation of the largest address ($X_L$) of an existing data item in the linked list, such that $X_L < X$, where X is the address of a new data entry to be inserted into the linked list at a location therein after the existing data item of address $X_L$.

The foregoing is accomplished by a linked list search processor comprising one or more search levels, each search level having a search processor module and a memory unit interconnected with one another. The number of search levels is dependent upon the number of bits which form a search argument. The magnitude of the address of a new data element search argument is used as the basis or condition for searching the existing data items in the list for finding a particular location therein at which to insert the new entry. Each basic memory unit contains one or more eight bit vectors which store information regarding the magnitudes of existing data items in the list. Each basic search processor module is a three bit device which is capable of accessing a particular eight bit vector from the associated memory unit to provide information corresponding to a particular data item of the linked list in response to the search argument. The resultant field of each search level is supplied to the output of the search processor for providing thereat a signal which is indicative of a location in the linked list at which the new data entry is to be inserted.

BRIEF DESCRIPTION OF THE DRAWINGS

FIG. 1 is a flow diagram to illustrate a prior art technique for searching an ordered linked list of data items;

FIG. 2 is a representation of the linked list search processor which forms the present invention;

FIG. 4 is a block diagram to illustrate the flow of data in one search level of the present linked list search processor;

FIGS. 5, 6, and 7 illustrate respective examples of the technique by which a linked list is rapidly searched by means of the present linked list search processor;

FIGS. 5a, 6a and 7a represent respective linked lists of stored data items in which a new entry is to be inserted;

DESCRIPTION OF THE PREFERRED EMBODIMENT

Figure 3:
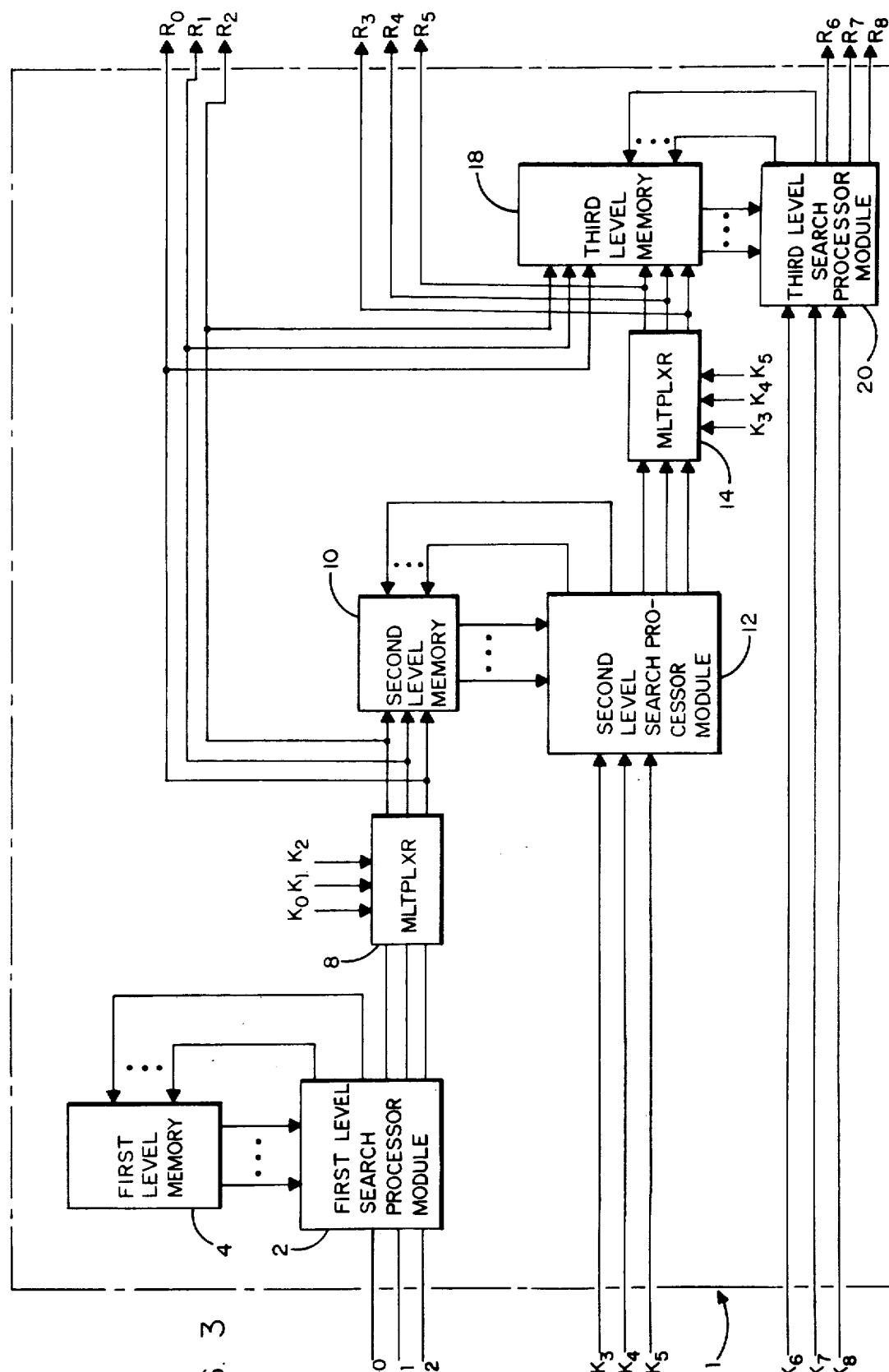
FIG. 3 is a block diagram to illustrate the structure of the present linked list search processor.

Referring now to the drawings, FIG. 1 is illustrative of a prior art technique for searching an ordered linked list of data items which is stored in a memory so that information regarding a video scan line can be assembled for subsequent display. Each data item of the linked list provides information regarding a respective scan line segment. Such information includes, but is usually not limited to, the starting coordinate (designated $X_o-X_n$), the length (designated $L_o-L_n$) and a pointer (designated $P_o-P_n$) to permit data items corresponding to additional scan line segments of the list to be sequentially located. As will be known to those skilled in the art, a plurality of scan line segments are particularly oriented relative to one another to form a scan line, and a plurality of scan lines define mathematical elements (e.g. polygons) which are displayed to form a computer generated image. When each new entry to the linked list is read, data regarding the corresponding scan line segment is particularly oriented in the list according to the magnitude of the starting coordinate X thereof relative to the magnitudes of the respective starting coordinates $X_o-X_n$ of other scan line segments which are stored in the linked list. To accomplish the foregoing, the starting coordinates of each data item in the linked list are typically read sequentially according to a serial path defined by the pointers $P_o-P_n$. The new data entry is selectively inserted into the linked list, such that the magnitude (X) of the scan line segment starting coordinate thereof is greater than the magnitude ($X_L$) of the starting coordinate of some preceeding scan line segment. That is, the linked list is sequentially scanned from one data item to another via a path defined by the pointers $P_o-P_n$ in order to locate the largest scan line segment starting coordinate $X_L$, such that $X_L < X$. However, such sequential scanning of the starting coordinates of the scan line segments of the linked list by means of a pointer defined path is inherently time consuming, especially when the list is long and the new data entry is to be located near the end of the list.

The present invention provides an efficient information searching and processing means by which information stored within a linked list can be scanned with increased speed and without regard to a pointer defined, serial search path common to the prior art, so as to correspondingly minimize the time by which successive data entries can be read and selectively inserted into the list according to the magnitudes of their respective scan line segment starting coordinates. The preferred means for accomplishing the foregoing is by way of a high speed search processor comprising a plurality of search processor modules, memories, and multiplexer control stages that are interconnected together to encode, store, decode, and rapidly access information in a linked list regarding one scan line of a computer generated image.

Referring to FIG. 2 of the drawings, the linked list search processor 1 of the present invention is capable of rapidly searching a linked list of data items to find a particular location in the list at which to insert a new data entry. According to the present invention, the linked list is loaded with data items containing information relating only to the starting coordinates of a plurality of scan line segments which, when assembled, form one scan line of a computer generated image. By way of example, and as will be pointed out shortly, each item stored in the linked list consists of one word of nine data bits. Additional information (e.g. regarding the length, polygon number, and Z-coordinate of the scan line segments) is stored in an auxiliary memory, which is described in greater detail when referring to FIG. 9 of the drawings. The data items are located in the list in a particular order according to magnitude. Once the search operation has been completed, the search processor 1 is adapted to identify a location in the linked list at which to insert the new data entry, depending upon the magnitude of the scan line segment starting coordinate thereof relative to the magnitudes of the scan line segment starting coordinates of other data items which have been previously stored in the list. Thus, the data items which form the linked list are particularly ordered, so that the magnitude and address of each successive scan line segment starting coordinate is greater than the magnitude and address of a preceeding scan line starting coordinate.

The presently disclosed search processor 1 is also adapted to set and clear the bits of a data item stored in the linked list. Moreover, before any data entry regarding a new scan line can be read and stored, the linked list must first be initialized. That is, the search processor 1 is conditioned to insert a fixed reference entry, which entry provides no useful information regarding a scan line segment. The purpose of the reference entry is to permit newly read data entries to be suitably located within the list depending upon the magnitude of the scan line segment starting coordinate thereof (as previously disclosed) relative to the magnitude of the reference entry and the magnitude of previously read and stored scan line segment starting coordinates, if any. Typically, the reference entry is inserted as the last entry of the linked list.

Referring now to FIG. 3 of the drawings, a block diagram is illustrated which is representative of the structure for the linked list search processor 1 which forms the present invention. Each new data entry, which is indicative of the magnitude (i.e. address) of the starting coordinate of a corresponding scan line segment, is represented by a nine bit binary number, which number forms the input search argument to search processor 1. Other information regarding a scan line segment (e.g. the length, polygon number and Z-vector thereof) is located in a temporary memory and not used as a condition by which to search the linked list. A nine bit number is utilized herein to provide an information field of convenient size. However, it is to be understood that the number of bits which represent a scan line segment starting coordinate and input search argument is not to be regarded as a limitation of the present invention, inasmuch as any suitably sized information field is contemplated herein.

The first three bits of the scan line segment starting coordinate, designated $K_0$, $K_1$ and $K_2$, are applied to corresponding input terminals of a first level search processor module 2. The bits $K_0$, $K_1$ and $K_2$ are indicative of the three most significant bits of the nine bit starting coordinate. The first level search processor module 2 is preferably a three bit device which is adapted to encode the three most significant bits of a data entry into eight bits of memory. Details of the first level search processor module 2 will be more fully described hereinafter when referrring to FIGS. 8a and 8b of the drawings. Connected to search processor module 2, by way of eight multiplexer controlled data lines, is a first level memory 4. First memory level 4 is preferably a 74F534 microelectronic chip programmed to form an 1×8 bit memory, so as to store therein a single eight bit vector. The details for implementing and utilizing such vector to rapidly search a linked list will also be more fully described hereinafter when referring to FIGS. 5-7 of the drawings. Eight data lines are also connected from first level memory 4 to search processor module 2 so as to permit data to be transferred to and from first level search processor module 2 via the pair of eight data line sets.

Three output terminals of first level search processor module 2 are connected to corresponding input terminals of a three bit multiplexer 8. Multiplexer 8 preferably comprises a 74F157 microelectronic chip. The multiplexer chip is connected to receive the binary bits designated $K_0$, $K_1$ and $K_2$. Three output terminals of multiplexer 8 are connected to supply three bits, designated $R_0$, $R_1$ and $R_2$, of an output signal from the presently disclosed linked list search processor 1. The aforementioned three output terminals of multiplexer 8 are also connected to corresponding input terminals of a second search level memory 10. Second level memory preferably comprises a pair of 74189 microelectronic chips cascaded together and programmed to form an 8×8 bit memory, so as to store therein an array of 8-eight bit vectors.

Eight data lines connect second level memory 10 to a second level search processor module 12. Moreover, the fourth, fifth and sixth bits, designated $K_3$, $K_4$ and $K_5$, of the nine bit scan line segment starting coordinate are applied to corresponding input terminals of second level search processor module 12. The bits $K_3$, $K_4$ and $K_5$ are indicative of the fourth, fifth and sixth most significant bits of the nine bit scan line segment starting coordinate of the new data entry to be inserted into the linked list. As will be disclosed in greater detail hereinafter, search processor module 12 is constructed in substantially identical fashion to the first level search processor module 2. That is, second level search processor module 12 is also a three bit device which is adapted to encode the fourth, fifth and sixth most significant bits of a data entry into eight bits of memory. Eight multiplexer controlled data lines are connected from second level search processor module 12 to second level memory 10 so as to permit data to be transferred to and from search processor module 12 via the pair of eight data line sets.

Three output terminals of second level search processor module 12 are connected to corresponding input terminals of a three bit multiplexer 14. Multiplexer 14 is substantially identical in construction to the multiplexer 8 which is interconnected between first level search processor module 2 and second level memory 10. That is, multiplexer 12 preferably comprises a 74F157 microelectronic chip. The multiplexer chip is also connected to receive the binary bits designated $K_3$, $K_4$ and $K_5$. Three output terminals of multiplexer 14 are connected to supply three additional bits, designated $R_3$, $R_4$ and $R_5$, of the output signal from the presently disclosed linked list search processor 1.

The aforementioned three output terminals of multiplexer 14 as well as the aforementioned three output terminals of multiplexer 8 are connected to six corresponding input terminals of a third level memory 18. Third level memory 18 preferably comprises a pair of 256×4 bit memories, such as, for example, two 93422 microelectronic chips cascaded together and programmed to operate as a 64×8 bit memory, so as to store therein an array of 64-eight bit vectors.

Eight data lines connect third level memory 18 to a third level search processor module 20. Moreover, the seventh, eighth and ninth bits, designated $K_6$, $K_7$, and $K_8$, of the nine bit scan line segment starting coordinate are applied to corresponding input terminals of third level search processor module 20. The bits $K_6$, $K_7$, and $K_8$ are indicative of the three least significant bits of the scan line segment starting coordinate of the new data entry. Search processor module 20 is constructed in substantially identical fashion to the first and second level search processor modules 2 and 12. That is, third level search processor module 20 is also a three bit device which is adapted to encode the three least significant bits of data entry into eight bits of memory. Eight multiplexer controlled data lines are connected from third level memory 20 to third level memory 18 so as to permit data to be transferred to and from search processor module 20 via the pair of eight data line sets.

Three output terminals of the third level search processor module 20 are connected to supply three additional bits, designated $R_6$, $R_7$ and $R_8$ of the output signal from the presently disclosed linked list search processor 1. Thus, the output signal of search processor 1 is represented by a nine bit binary number having bit positions defined by $R_0$-$R_8$, where $R_0$ is the most significant bit.

The block diagram of FIG. 3 also illustrates the sequential operation of the present search processor 1 by a flow path including first level search processor module 2, multiplexer 8, second level memory 10, second level search processor module 12, multiplexer 14, third level memory 18, and third level search processor module 20. The delay inherent in search processor 1 is defined by the time to complete the aforementioned sequential flow path.

As will be apparent from FIG. 3, the presently disclosed linked list search processor 1 is comprised of first, second and third search levels. Each search level includes a search processor module and an associated memory. A respective multiplexer (e.g. 8 and 14) is connected to control the flow of data between the first and second search levels and the second and third search levels. However, multiplexer 8 and 14 are not utilized to search the linked list. Although three search levels are described, it is to be understood that the number of search levels illustrated in FIG. 3 should not be regarded as a limitation of the present invention, and the presently disclosed search processor 1 may be formed (i.e. expanded) by any suitable number of search levels, depending upon the number of input data bits to be processed (i.e. the length of a scan line segment starting coordinate). In the illustrated embodiment, the starting coordinate of each scan line segment is represented by a nine bit binary number. Each search level processor module 2, 12 and 20 is adapted to process three data bits. Therefore, inasmuch as a total of nine bits of information is to be processed, three search levels are utilized herein. However, the number of bits processed by each search processor module 2, 12 or 20 is also not to be regarded as a limitation of the present invention, and more or less than three bits may be processed thereby.

Referring to FIG. 4 of the drawings, a generalized flow diagram is presented to illustrate the transfer of data within one search level of the presently disclosed linked list search processor. More particularly, an m level search processor module 24 which receives n input data bits (indicative of a certain number of bits of a scan line starting coordinate) via n respective data lines will subsequently provide n output data bits to a succeeding m+1 search level via n respective data lines. What is more, the m level search processor transfers $2^n$ data bits via respective data lines to an associated m level memory 26. Moreover, $2^n$ data bits are transferred via respective data lines from the m level memory 26 to the m level search processor 24. In the present example of FIG. 3 and for each of the first, second and third search levels: n=3, so that eight data lines transfer eight data bits to and from a search processor module 2, 12 or 20.

The operation of the presently disclosed linked list search processor is described while referring concurrently to FIGS. 3 and 5 of the drawings. As previously disclosed, the search processor 1 has a configuration so as to be capable of reading a new data entry search argument (i.e. representing the magnitude, i.e., address, of a scan line segment starting coordinate) and searching a linked list of previously stored data items for finding a particular location in the linked list (depending upon the magnitudes of the other scan line segment starting coordinates) at which to insert the new data entry. For purposes of example only, a new data entry search argument (i.e. $K_0$-$K_8$) is expressed by the nine bit binary number 011110110. The three most significant bits (011) of the data entry are read and supplied to the first level search processor module 2 for a first level search. As earlier disclosed, 1-eight bit vector 28 is stored in first level memory 4. The eight bit vector 28 contains information regarding the three most significant bits of other data items which have been previously read and inserted into the linked list. Upon suitable command, the contents of eight bit vector 28 are made available for access by first level search processor module 2 to enable a first level search.

The three most significant bits ($K_0$, $K_1$, $K_2$) of the data entry search argument are encoded, whereby the contents of the eight bit vector 28 are accessed at the row address (i.e. 011) corresponding to such three most significant bits. In a first case, it is assumed that a binary 0 is found at the addressed location of the eight bit vector 28 corresponding to the three most significant bits of the data entry search argument. In such a case, the cells of the eight bit vector 28 are sequentially scanned beginning at address 011 to locate the succeeding or next cell therein to contain a binary 1 (indicative of at least one data item which has been previously inserted into the linked list). In the present example, the memory cell corresponding to row address 101 is the next location of eight bit vector 28 in which a binary 1 is stored. Accordingly, first level search processor module 2 provides a decoded output field consisting of the three bit data set (i.e. 101) of results from the first level search. The decoded output field is supplied from processor module 2 to multiplexer 8. In the presently described first case, multiplexer 8 operates to supply a three bit data set to respective output terminals of the linked list search processor 1, such that the three most significant bits (designated $R_0$, $R_1$, $R_2$) of the output signal from processor 1 correspond to 101. Multiplexer 8 also operates to supply the three bit data set to second level memory 10, whereby to enable a second level search.

As earlier disclosed, 8-eight bit vectors 30 are stored in second level memory 10. In the presently described first case, where a binary 0 is found at the row address of the eight bit vector 28 corresponding to the three most significant bits of the data entry search argument, a mapping occurs between the eight bit vector 28 of the first level search and the array of eight bit vectors 30 of the second level search. That is, the resultant output field from first level search processor 2 is used to address a corresponding eight bit vector 32 (e.g. designated by column address 101) from the array of 8-eight bit vectors 30. Hence, the contents of the particular eight bit vector 32 addressed by the three bit output field from the first level search are accessed by second level search processor 12 and sequentially scanned to locate the succeeding (i.e. next) cell thereof to contain a binary 1 (indicative of a data item which has been previously inserted into the linked list). In the present case, the row address of the cell in eight bit vector 32 at which the next binary 1 is stored corresponds to another three bit data set (i.e. 100) which is established as the output of second level search processor module 12. Accordingly, second level search processor module 12 provides a decoded output field consisting of the three bit data set 100 as the output from the second level search. The decoded output field is supplied from processor module 12 to multiplexer 14.

In this presently described first case, multiplexer 14 operates to supply the three bit data set to respective output terminals of the linked list search processor 1, such that the fourth, fifth and sixth most significant bits (designated $R_3$, $R_4$, $R_5$) of the output signal thereof correspond to 101. Accordingly, the six most significant bits ($R_0$–$R_5$) of the resultant field at the output of search processor 1 correspond to 101100 (i.e. a combination of the respective three bit data sets from each of the first and second level searches.

FIG. 5a is illustrative of the (four) data items found in the linked list of FIG. 5 and stored in first and second level memories 4 and 10 of FIG. 3. Also indicated is the location in the list at which the new data entry (e.g. 011110110) is to be added in the present example, depending upon the results of the first and second (and third) level searches.

Multiplexers 8 and 14 operate to supply the respective three bit data sets (101 and 100) from first and second search processors 2 and 12 to third level memory 18, whereby to enable a third level search for the final three bits ($R_6$–$R_8$) of the nine bit resultant field from the linked list search processor 1 of the present invention. Third level memory 18 has a total of 512 bits of information, with each bit corresponding to one possible entry in the linked list. Although not illustrated in FIG. 5, the third level search is performed in an identical fashion to that when performing the aforementioned second level search. That is, a mapping occurs between the respective eight bit vectors 28 and 30 from the first and second level searches and a corresponding eight bit vector from the array of 64-eight bit vectors which form the third level memory 18.

Figure 6:
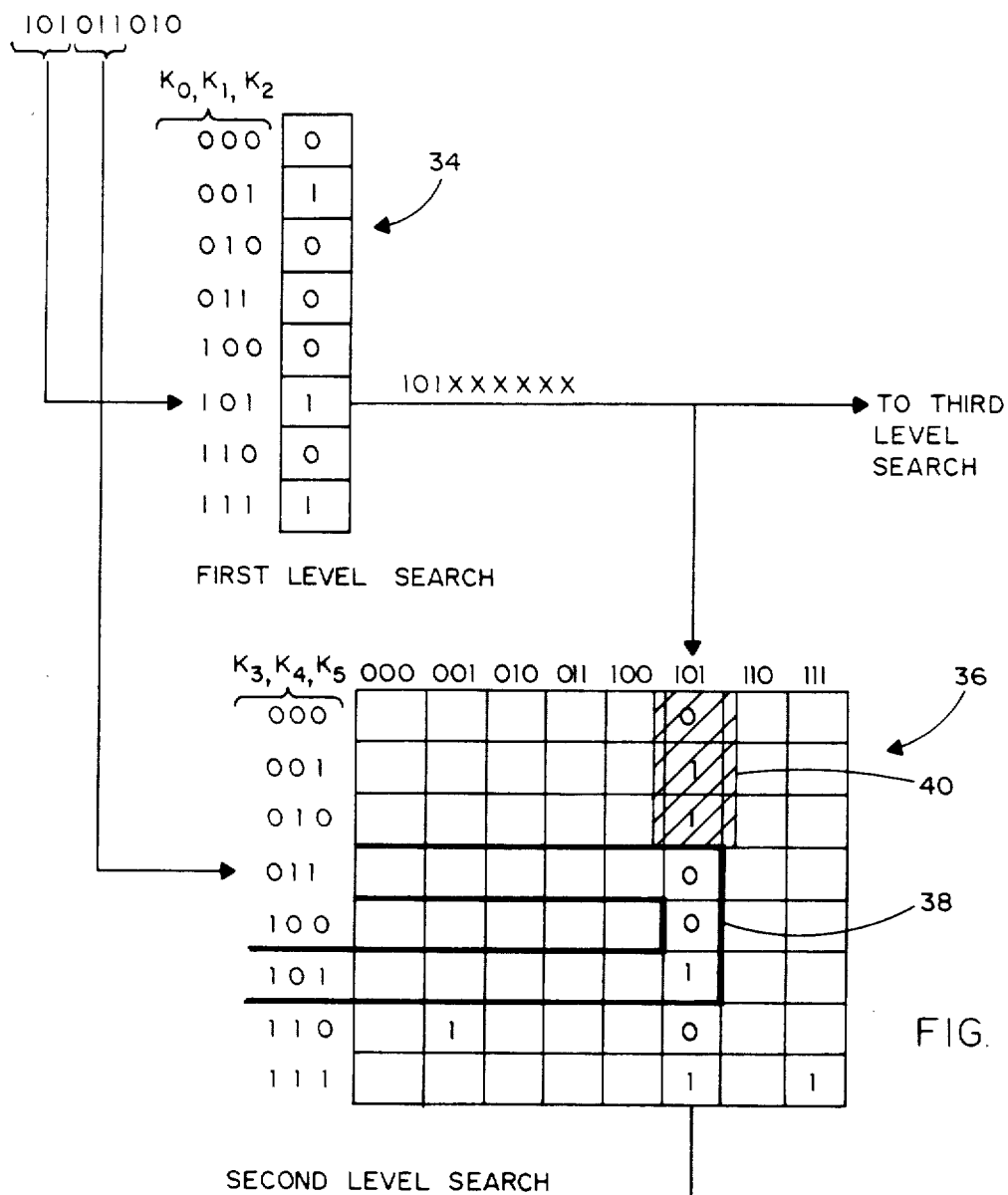

Referring concurrently to FIGS. 3 and 6 of the drawings, a second case is illustrated to further demonstrate the operation of the linked list search processor 1 of the present invention. For purposes of example, the new data entry search argument ($K_0$–$K_8$) is expressed by the nine bit binary number 101011010. The three most significant bits (101) of the data entry search argument are read and supplied to first level search processor module 2 for a first level search. Upon suitable command, the contents of the single eight bit vector 34 stored in first level memory 4 are made available for access by module 2. The three most significant bits ($K_0$, $K_1$, $K_2$) of the data entry search argument are encoded, whereby the contents of the eight bit vector 34 are accessed at the row address (i.e. 101) corresponding to such three most significant bits. In this second case, it is assumed that a binary 1 is stored at the addressed location of the eight bit vector 34 corresponding to the three most significant bits of the data entry search argument.

In such a case, first level search processor module 2 provides a decoded output field consisting of the three bit data set (i.e. 101) of results from the first level search. The decoded output field is supplied from processor module 2 to multiplexer 8. Multiplexer 8 operates to supply a three bit data set to respective output terminals of the linked list search processor 1, such that the three most significant bits ($R_0$, $R_1$, $R_2$) of the output signal thereof correspond to 101.

However, and inasmuch as the addressed cell in the eight bit vector 34 corresponding to the three most significant bits of the search argument is already occupied by a binary 1 (indicative of at least one other data item in the linked list with the same three most significant bits), the fourth, fifth and sixth most significant bits ($K_3$, $K_4$, $K_5$) of the data entry search argument must also be read and processed during the second level search. The fourth, fifth and sixth most significant bits (i.e. 011) of the search argument are supplied to input terminals of second level search processor module 12. Moreover, multiplexer 8 operates to supply the three bit data set from first level search processor module 2 to second level memory 10, whereby to enable the second level search.

As previously disclosed, 8-eight bit vectors 36 are stored in second level memory 10. A mapping occurs between the eight bit vector 34 of the first level search and the array of eight bit vectors 36 of the second level search. Hence, the resultant output field from first level search processor module 2 is used to address a corresponding eight bit vector 38 (e.g. designated by the column address 101) from the array of eight bit vectors 36. In the presently described second case, the contents of the particular eight bit vector 38 are sequentially scanned, beginning with the cell having a row address (i.e. 011) corresponding to the fourth, fifth and sixth most significant bits ($K_3$, $K_4$, $K_5$) of the data entry search argument. More particularly, the contents of eight bit vector 32 are scanned beginning at the row address 011 to locate the succeeding (i.e. next) cell thereof to contain a binary 1 (indicative of a data item which has been previously inserted into the linked list). In the present example, the row address of the cell in eight bit vector 38 at which the next binary 1 is stored corresponds to another three bit data set (i.e. 101) which is established as the output of the second level search processor module 12.

In the presently described second case, every cell of eight bit vector 38 having a row address of less than the particular row address 011 (i.e. $K_3$, $K_4$, $K_5$) is masked or forced to a binary 0. The size of the mask field 40 is dependent upon the magnitude of the fourth, fifth and sixth most significant bits of the data entry search argument. Details for generating the mask field 40 will be disclosed in greater detail hereinafter.

Accordingly, second level search processor module 12 provides a decoded output field consisting of the three bit data set 101 as the output from the second level search. The decoded output field is supplied from processor module 12 to multiplexer 14. In this presently described second case, multiplexer 14 operates to supply the three bit data set to respective output terminals of the linked list search processor 1, such that the fourth, fifth and sixth most significant bits (designated $R_3$, $R_4$, $R_5$) of the output signal thereof correspond to 101. Therefore, the six most significant bits ($R_0$–$R_5$) of the resultant field at the output of search processor 1 correspond to 101101 (i.e. a combination of the respective three bit data sets from each of the first and second level searches).

Figure 6A:
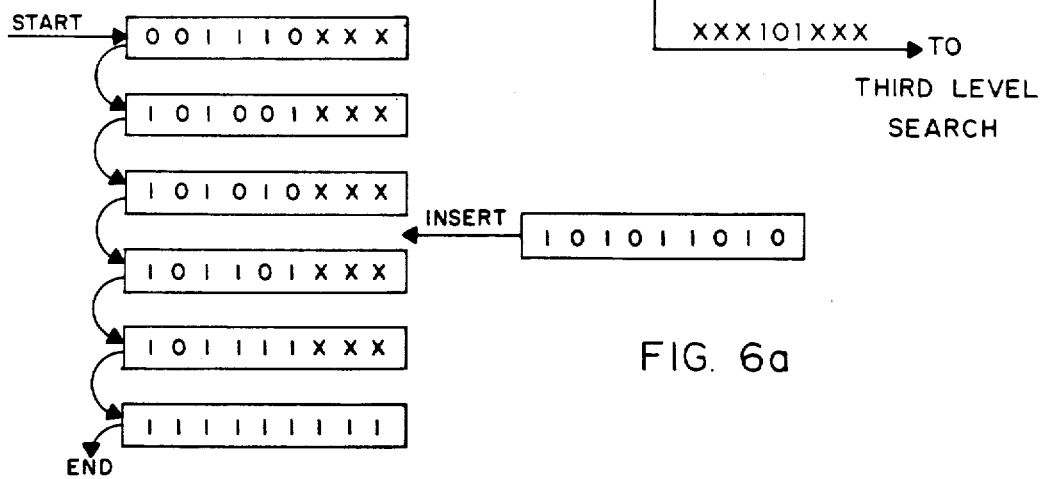

FIG. 6a is illustrative of the (six) data items found in the linked list of FIG. 6 and stored in first and second level memories 4 and 10 of FIG. 3. Also indicated is the location in the list at which the new data entry (e.g. 101011010) is to be added in the present example, depending upon the results of the first and second (and third) level searches.

Multiplexers 8 and 14 operate to supply the respective three bit data sets (101 and 101) from first and second level search processor modules 2 and 12 to third level memory 18, whereby to enable a third level search for the final three bits ($R_6$-$R_8$) of the nine bit resultant field from the linked list search processor 1 of the present invention. Although not illustrated in FIG. 6, the third level search is performed in an identical fashion to that when performing the second level search during the first case of FIG. 5. That is, a mapping occurs between the respective eight bit vectors 34 and 38 from the first and second level searches and a corresponding eight bit vector from the array of 64-eight bit vectors which form third level memory 18.

Referring concurrently to FIGS. 3 and 7 of the drawings, a third case is illustrated to still further demonstrate the operation of the linked list search processor 1 of the present invention. For purposes of example, the new data entry search argument ($K_0$-$K_8$) is expressed by the nine bit binary number 101110110. Similar to the example of the second case in FIG. 6, the three most significant bits (101) of the data element search argument are read and supplied to first level search processor module 2 for a first level search. Upon suitable command, the eight bit vector 42 stored in first level memory 4 is made available for access by module 2. The three most significant bits ($K_0$, $K_1$, $K_2$) of the data entry search argument are encoded, whereby the contents of the eight bit vector 42 are accessed at the row address (i.e. 101) corresponding to such three most significant bits. In this third case, (as well as in the aforementioned second case), it is assumed that a binary 1 is stored at the addressed location of the eight bit vector 42 corresponding to the three most significant bits of the data entry search argument (indicative of at least one other data item in the linked list with the same three most significant bits). In such a case, the first level search processor module 2 provides a decoded output field consisting of the three bit data set (i.e. 101) of results from the first level search.

However, and similar to the previously described second case, the fourth, fifth and sixth most significant bits ($K_3$, $K_4$, $K_5$) of the data element search argument must also be read and processed during the second level search, inasmuch as the addressed location in the eight bit vector 42 corresponding to the three most significant bits of the search argument is already occupied by a binary 1. The fourth, fifth and sixth most significant bits (i.e. 110) of the search argument are supplied to input terminals of second level search processor module 12. Moreover, multiplexer 8 operates to supply the three bit data set from first level search processor module 2 to second level memory 10, whereby to select a particular eight bit vector therefrom and enable the second level search.

As previously disclosed, 8-eight bit vectors 44 are stored in second level memory 10. A mapping occurs between the eight bit vector 42 of the first level search and the array of eight bit vectors 44 of the second level search. Hence, the resultant output field from first level search processor 2 is used to address a corresponding eight bit vector (e.g. designated by the column address 101) from the array of eight bit vectors 44. In the presently described third case, the contents of the particular eight bit vector 46 are sequentially scanned, beginning with the cell having a row address (i.e. 110) corresponding to the fourth, fifth and sixth most significant bits ($K_3$, $K_4$, $K_5$) of the data entry search argument. More particularly, the contents of eight bit vector 46 are sequentially scanned beginning at the row address 110 to locate the succeeding (i.e. next) cell thereof to contain a binary 1 (indicative of a data item which has been previously inserted into the linked list).

As previously described in the second case, every cell of the eight bit vector 46 having a row address of less than the particular row address 110 is masked or forced to a binary 0. However, and unlike the second case, there is no unmasked cell remaining in eight bit vector 46 at or after row address 110 in which a binary 1 is stored. Therefore, and according to the example of this third case, the first three significant bits (110) of the data element search argument are incremented by a binary 1, and all of the remaining bits of the search argument are forced to a binary 9. Hence, in this third case, original data entry search argument 101110110 is transformed into the search argument 110000000, and new first and second level searches are implemented in a manner consistent with the techniques as previously disclosed. The new first and second level searches will find at least one data item stored in the linked list corresponding to the last entry (i.e. 111111111) therein, which entry is inserted during the previously described initialization process.

With 110000000 as the transformed search argument, the resultant field established as the output of first level search processor module 2 during the first level search is the three bit data set 111. This output field is supplied from processor module 2 to multiplexer 8. Multiplexer 8 operates to supply the three bit data set to respective output terminals of the linked list search processor 1, such that the three most significant bits ($R_0$, $R_1$, $R_2$) of the output signal therefrom correspond to 111. Multiplexer 8 also operates to supply the three bit data set 111 to second level memory 10, whereby to enable another second level search. Accordingly, and as previously described during the aforementioned first case of FIG. 5, a mapping occurs between the eight bit vector 42 of the first level search and the array of 8-eight bit vectors 44 of the second level search. That is, the resultant output field from first level search processor module 2 is used to address a corresponding eight bit vector 48 having the column address 111. Hence, the contents of the eight bit vector 48 addressed by the three bit data set from the first level search are sequentially scanned to locate the succeeding (i.e. next) cell thereof to contain a binary 1. In the present example, the row address of the location in eight bit vector 48 at which the next binary 1 is stored corresponds to the three bit data set 010 which is established as the output of second level search processor 12. Accordingly, second level search processor module 12 provides a decoded output field consisting of the three bit data set 010 as the output from the second level search. The decoded output field is supplied from processor module 12 to multiplexer 14.

In this third case, multiplexer 14 operates to supply the three bit data set to respective output terminals of the linked list search processor 1, such that the fourth, fifth and sixth most significant bits ($R_3$, $R_4$, $R_5$) of the output signal thereof correspond to 010. Hence, the six most significant bits ($R_0$–$R_5$) of the resultant field at the output of search processor 1 correspond to 111010 (i.e. a combination of the respective three bit data sets from each of the first and second level searches).

FIG. 7a is illustrative of the (six) data items found in the linked list of FIG. 7 and stored in first and second level memories 4 and 10 of FIG. 3. Also indicated is the location in the list at which the new data entry (e.g. 101110110) is to be added in the present example, depending upon the results of the first and second (and third) level searches.

Similar to the first and second cases described above, multiplexers 8 and 14 operate to supply the respective three data bit sets (111 and 010) from first and second search processor modules 2 and 12 to third level memory 18, whereby to enable a third level search for the final three bits ($R_6$–$R_8$) of the nine bit resultant field from the linked list search processor 1 of the present invention. Although not illustrated in FIG. 7, the third level search is performed in an identical fashion to that described in either of the first or second cases. That is, a mapping occurs between the respective eight bit vectors 42 and 48 from the first and second level searches and a corresponding eight bit vector from an array of 64-eight bit vectors which form the third level memory 18.

Accordingly, and after completion of the third level search, third level search processor module 20 provides to respective output terminals of linked list search processor 1 a decoded output field consisting of a three bit data set which corresponds to the seventh, eighth and ninth most significant bits ($R_6$, $R_7$, $R_8$) of the nine bit search processor output signal. Therefore, and as previously indicated, the output data fields resulting from each of the first, second and third level searches at the first, second and third search processor modules 2, 12 and 20 form the nine bit output signal ($R_0$–$R_8$) of linked list search processor 1.

By virtue of the present invention and the soon to be disclosed logic therefor, the nine bit output signal of linked list search processor 1 provides the output search result for any particular input search argument. That is, the output of search processor 1 provides the largest magnitude ($X_L$) for a scan line segment starting coordinate previously stored in the linked list, such that $X_L$ is less than the magnitude (X) of the scan line segment starting coordinate of the new data entry to be added to the linked list. Since the data items in the linked list are stored in an ordered sequence according to the magnitude of their respective scan line segment starting coordinates, the new data entry is inserted into the linked list at a particular location therein following the scan line segment having the starting coordinate (i.e. address) of magnitude $X_L$.

Figure 8:
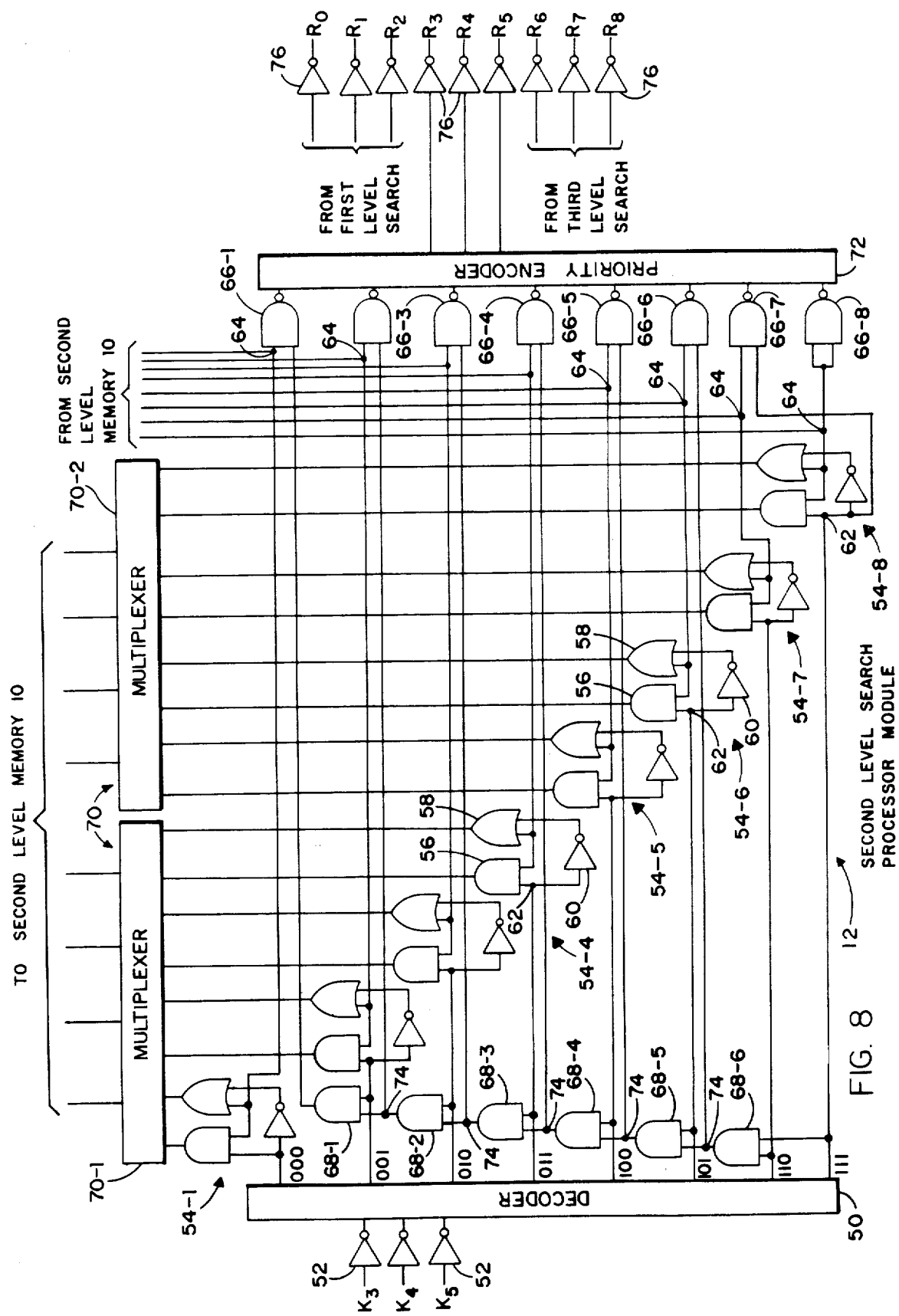
FIG. 8 is a schematic circuit of the logic for implementing the basic three bit search processor module of the present linked list search processor.

A schematic circuit is provided in FIG. 8 of the drawings of the logic to form each of the first, second and third level search processor modules 2, 12 and 20 of the present linked list search processor by which to process a total of nine bits of input data regarding a scan line segment starting coordinate. More particularly, and for the present search processor having three search levels and a nine bit search argument, each search processor module is of identical construction and capable of processing three data bits. However, and for purposes of example, only the details of second level search processor module 12 are illustrated and disclosed hereat.

The logic to implement a three bit search processor module (e.g. 12) includes an input decoder 50. Decoder 50 is preferably a 74138 microelectronic chip. Three binary bits of data (designated $K_3$, $K_4$, $K_5$) which are representative of the fourth, fifth and sixth most significant bits of the input search argument are supplied to respective input terminals of decoder 50. The logical state of each data bit is inverted by means of a conventional inverter 52. Decoder 50 has eight output terminals, only one of which is adapted to be driven to a binary 0 level at any one time. Each output terminal is connected to a respective one of an array of eight memory setting and clearing stages 54 at a common electrical junction 62. Inasmuch as each memory setting and clearing stage 54 is identically constructed, only one stage 54-6 will be described in detail.

More particularly, each memory setting and clearing stage (e.g. 54-6) comprises a two-input AND gate 56, a two-input OR gate 58, and an inverter 60. An input terminal of each of AND gate 56 and inverter 60 are connected together at the aforementioned common electrical junction 62 with one output terminal of decoder 50. The output terminal of inverter 60 is connected to one input terminal of OR gate 58. The second input terminals of each of AND gate 56 and OR gate 58 are connected together at a common electrical junction 64. The output terminals of each of AND gate 56 and OR gate 58 are connected to respective input terminals of a multiplexer 70.

Multiplexer 70 preferably comprises a pair of 74F158 microelectronic chips 70-1 and 70-2 which are programmed to operate as a single eight bit multiplexer 70. Each multiplexer chip 70-1 and 70-2 has eight input terminals, such that multiplexer 70 has a total of sixteen input terminals. A pair of input terminals is connected to the output terminals of an AND gate 56 and an OR gate 58 of a respective memory setting and clearing stage 54, as previously disclosed. Hence, each multiplexer chip 70-1 and 70-2 is interfaced with four different memory setting and clearing stages 54 of the eight stage array thereof. Each multiplexer stage 70-1 and 70-2 has four output terminals, such that multiplexer 70 is provided with a total of eight output terminals. Each output terminal of multiplexer 70 is connected to a respective input terminal of the second level memory (designated 10 in FIG. 3). Each multiplexer chip 70-1 and 70-2 has conventional clocking and selection circuitry (not shown) associated therewith by which to select a particular AND or OR gate 56 or 58 from a setting and clearing stage 54. In operation, the array of eight setting and clearing stages 54 and multiplexer 70 act to selectively set or clear data bits of the 8-eight bit vectors that are stored in the second level memory 10, depending upon the magnitude (i.e. logical state) of the binary data bits ($K_3$, $K_4$, $K_5$) that are supplied to decoder 50.

More particularly, the output signals of successive AND gates 56 from the array thereof generate a mask to clear a bit from memory 10, while the output signals of successive OR gates 58 from the array thereof generate a different mask to set or add a bit to memory 10. That is, the output state of decoder 50 controls the gating of the AND gates 56 and OR gates 58 (by way of inverters 60). One bit of an eight bit data set is supplied from memory 10 to each setting and clearing stage 54 at an aforementioned common electrical junction 64 with an input terminal to each of an AND gate 56 and an OR gate 58. A particular mask is established by memory setting and clearing stages 54, such that the output signals from successive AND gates 56 or OR gates 58 are selectively applied to memory 10 via multiplexer 70. A memory data bit will be either set, cleared or remain unchanged, depending upon the magnitude of the eight bit output signal from decoder 50 and the AND or OR gate 56 or 58 selected by multiplexer 70. Multiplexer 70 also has a control line (not shown) by which to clear an entire word from memory 10 prior to receiving new information regarding a different scan line. More particularly, to clear memory 10, each output terminal of multiplexer 70 is driven to a binary 1 level when a suitable command is received on the aforementioned control line. The binary signal levels are inverted by memory 10 so that respective bits thereof can be cleared.

The operation of a memory setting and clearing stage (e.g. 54-4) to set or clear a data bit stored in second level memory 10 will now be briefly described. In order to set a bit of memory 10, one particular output terminal of decoder 50 is driven to a binary 0 level (depending upon the magnitude of input data bits $K_3$, $K_4$, $K_5$), while all other output terminals thereof are driven to a binary 1 level. Inasmuch as the particular output terminal of decoder 50 (corresponding to the input data set 011) is connected to a first input terminal of a corresponding OR gate 58 via inverter 60 and common electrical junction 62, such first input terminal is driven to a binary 1 level. The second input terminal of OR gate 58 is driven to either of a binary 0 or binary 1 level at common electrical junction 64 by a respective output signal from second level memory 10 (the logical state of which signal is to be set to a binary 1). Because one input terminal thereof is driven to a binary 1, the output terminal or OR gate 58 is driven to a binary 1, regardless of the signal level to which the second terminal thereof is driven. Hence, a binary 1 signal is selectively applied to a corresponding input terminal of memory 10 by way of multiplexer 70. As will be understood by those skilled in the art, the output terminals of each of the other OR gates in the array of setting and clearing stages 54 are driven to either of a binary 0 or 1 level, depending upon the present logical states of the respective data bits in second level memory 10. Because the first input terminal of every other OR gate 58 is driven to a binary 0 by decoder 50, the ouput terminals of OR gates 58 are driven, at common electrical junctions 64, to signal levels corresponding to the data bits already stored in memory 10, so that such data bits remain unchanged.

In order to clear a bit of memory 10, one particular output terminal of decoder 50 is again driven to a binary 0 level, while all other output terminals thereof are driven to a binary 1 level. Inasmuch as the particular output terminal of decoder 50 is connected to a first input terminal of a corresponding AND gate 56 at common electrical junction 62, such first input terminal is likewise driven to a binary 0 level. The second input terminal of AND gate 56 is driven to either a binary 0 or a binary 1 level at common electrical junction 64 by a respective output signal from second level memory 10 (the logical state of which signal is to be cleared to a binary 0). However, since one input terminal thereof is driven to a binary 0, the output terminal of AND gate 56 is driven to binary 0, regardless of the signal level to which the second terminal thereof is driven. Hence, a binary 0 signal is selectively applied to a corresponding input terminal of memory 10 by way of multiplexer 70. As will be understood by those skilled in the art, the output terminals of each of the other AND gates in the array of setting and clearing stages 54 are driven to either of a binary 0 or 1 level, depending upon the present logical states of the respective data bits in second level memory 10. Because the first input terminal of every other AND gate 56 is driven to a binary 1 by decoder 50, the output terminals of AND gates 56 are driven, at common electrical junctions 64, to signal levels corresponding to the data bits already stored in memory 10, so that such data bits remain unchanged.

Each one of eight output terminals from second level memory 10 is respectively connected to an aforementioned common electrical junction 64 with a memory setting and clearing stage 54 and one input terminal of one of an array of eight two-input selector NAND gates 66. The second input terminal of each selector NAND gate 66 is connected to a common electrical junction 74. In the case of the last NAND gate 66-8, each of the input terminals thereof are connected together at the aforementioned common electrical junction 64 with the last setting and clearing stage 54-8. In the case of the seventh NAND gate 66-7, the second input terminal thereof is connected to the common electrical junction 62 at memory setting and clearing stage 54-8. The output terminals of NAND gates 66 are connected to a respective one of eight input terminals of a priority encoder 72. Thus, each selector NAND gate 66 is respectively connected between memory 10 and priority encoder 72.

Priority encoder 72 is preferably a 74148 microelectronic chip. Three output terminals of priority encoder 72 (corresponding to output terminals of second level search processor module 12) are respectively connected to input terminals of three inverters 76 to supply to inverters 76 the resultant field of processor module 12 in the form of a three bit data set, depending upon the results of the second level search and the output states of NAND gates 66. The output signals of inverters 76 correspond to th fourth, fifth and sixth most significant bits ($R_3$, $R_4$, $R_5$) of the nine bit output signal from the presently disclosed linked list search processor.

Second level search processor module 12 also includes an array of 6-two input AND gates 68 tied together in a serial chain. More particularly, one input terminal of each AND gate 68 is connected to the aforementioned common electrical junction 62 with a respective memory setting and clearing stage 54-2 to 54-7 and an output terminal of decoder 50. The second input terminal of each AND gate 68 is connected to the aforementioned common electrical junction 74 with the output terminal of a preceding AND gate in the serial chain thereof and an input terminal to selector NAND gate 66. In the case of the last AND gate 68-6 from the chain thereof, each input terminal is connected to a respective common electrical junction 62 formed with an output terminal from decoder 50 and a memory setting and clearing stage 54-7 and 54-8. In operation, and as will be described below, decoder 50, NAND gates 66 and the serial chain of AND gates 68 act to generate a mask field during the second or a higher level search (as has been described while referring to FIGS. 6 and 7 of the drawings).

The operation of the serial chain of AND gates 68 and the array of selector NAND gates 66 for generating and selectively positioning a mask field within an eight bit vector stored in the memory (e.g. 4 or 10) of the first or second search levels is now briefly described with the aid of the table below. For the purpose of convenience in the following example, reference is once again made to FIG. 6 of the drawings and to the eight bit vector 38 which, by virtue of the previously disclosed mapping technique between the first and second search levels, has been accessed from the array of eight-8 bit vectors stored in second level memory 10. Column (a) in the Table lists the contents of the eight bit vector 38 stored in second level memory 10 in an unmasked condition. As previously disclosed, the second level search processor module 12 is adapted to generate a mask field 40, and the contents of eight bit vector 38 in the masked condition are listed in column (b) of the Table.

input terminals of each selector NAND gate 66 in the array thereof. More particularly, the eight bits of data (listed at column (a) of the Table) which are stored in the second level memory at eight bit vector 38 are respectively applied to one input terminal of each selector NAND gate 66. The output signals (listed in column (d) of the Table) of AND gates 68 are respectively applied to the second input terminal of each selector NAND gate 66. Accordingly, and as is listed in column (e) of the Table, the output terminal of at least one of the eight NAND gates 66-6 (corresponding to bit position 101 at

TABLE

|  | (a) UNMASKED VECTOR 38 | (b) MASKED VECTOR 38 | (c) DECODER 50 OUTPUT | (d) AND GATES 68 OUTPUT | (e) NAND GATES 66 OUTPUT |
|---|---|---|---|---|---|
| 000 | 0 | 0 | 1 | 0 | 1 |
| 001 | 1 | 0 | 1 | 0 | 1 |
| 010 | 1 | 0 | 1 | 0 | 1 |
| 011 | 0 | 0 | 0 | 1 | 1 |
| 100 | 0 | 0 | 1 | 1 | 1 |
| 101 | 1 | 1 | 1 | 1 | 0 |
| 110 | 0 | 0 | 1 | 1 | 1 |
| 111 | 1 | 1 | 1 | 1 | 0 |

During the second level search of FIG. 6, the fourth, fifth and sixth most significant bits ($K_3$, $K_4$, $K_5$) of the data entry search argument are supplied to three corresponding input terminals of decoder 50. In the present example, decoder 50 provides an output signal consisting of the eight bit data set (listed at column (c) of the Table) 11110111 in response to the three bit input data set (i.e. 011) supplied thereto. One particular output terminal of decoder 50 (corresponding to the input data set 011) is driven to a binary 0 level, while each of the other output terminals of decoder 50 is driven to a binary 1 level. Thus, the output terminals of AND gates 68-6, 68-5 and 68-4 are driven to a binary 1 level, inasmuch as both of the input terminals thereof are driven to a binary 1 level. However, the output terminal of AND gate 68-3 is driven to a binary 0 level, inasmuch as one input terminal thereof is driven to a binary 0 level at the particular output terminal of decoder 50 corresponding to input data set 011. What is more, the binary 0 output level of AND gate 68-3 is propagated along the serial chain to each of the succeeding AND gates 68-2 and 68-1, such that the output terminal of each such AND gate in the chain thereof is also driven to a binary 0 level. The respective output levels of the six AND gates 68-1 to 68-6 which form the chain thereof are listed in column (d) of the Table. Thus, it will be apparent that the first three bit positions (i.e. 000, 001 and 010) in column (d) correspond to the addresses of those cells in vector 38 of FIG. 6 which are forced to a binary 0 as a result of the mask field 40 which is generated by the serial chain of six AND gates 68. A total of six AND gates 68 is used to form the serial chain, inasmuch as the particular cell of eight bit vector 38 which is accessed is not to be included in a mask field. Thus, neither a mask nor a mask generating AND gate is required in the event that the eight bit vector 38 is accessed at an address corresponding to the first cell (000) thereof. Moreover, a mask is not generated at the last cell of eight bit vector 38 if vector 38 is accessed at address 111. Accordingly, AND gates 68 are adapted to generate a six bit mask with the seventh bit in column (d) provided directly from decoder 50 and the eighth bit thereof (always) being a binary 1.

As previously disclosed, eight output terminals from the second level memory 10 are connected to respective which the first binary 1 is located in masked vector 38) is driven to a binary 0 level. The output signals of selector NAND gates 66 are respectively applied to the eight input terminals of priority encoder 72. NAND gates 66 (rather than AND gates, or the like) are utilized to implement a search processor module (e.g. 12) of the present invention, because of the nature of operation of the particular priority encoder 72 described herein, and no limitation is otherwise intended. Priority encoder 72 is responsive to the first binary 0 supplied thereto from NAND gates 66. The output of encoder 72 is a three bit data set which is indicative of such first binary 0 and which corresponds to the address (i.e. 101) of the first binary 1 located in the masked vector 38 at column b.

The output of priority encoder 72 is the resultant field (i.e. 101) of the second level search. That is, and as was previously disclosed, three output terminals of priority encoder 72 are connected to respective inverters 76 to provide the fourth, fifth and sixth most significant bits ($R_3$-$R_5$) of the nine bit output signal from the presently disclosed linked list processor. What is more, the three bit resultant fields from each of the first and third level searches are also inverted (by respective inverters 76), whereby to represent the remaining bits of the nine bit output signal. Accordingly, the nine bit output signal ($R_0$-$R_8$) of search processor 1 of FIG. 3 is indicative of the largest magnitude $X_L$ of an existing data item stored in the linked list and corresponding to a scan line segment starting coordinate to satisfy the input search condition, such that $X_L < X$, where X is the input search argument and the magnitude of the new data entry (i.e. scan line segment starting coordinate) to be inserted into the list. The new data entry is selectively inserted into the linked list at a location wherein following the address of the data item corresponding to the scan line starting coordinate of magnitude $X_L$.

Figure 9:
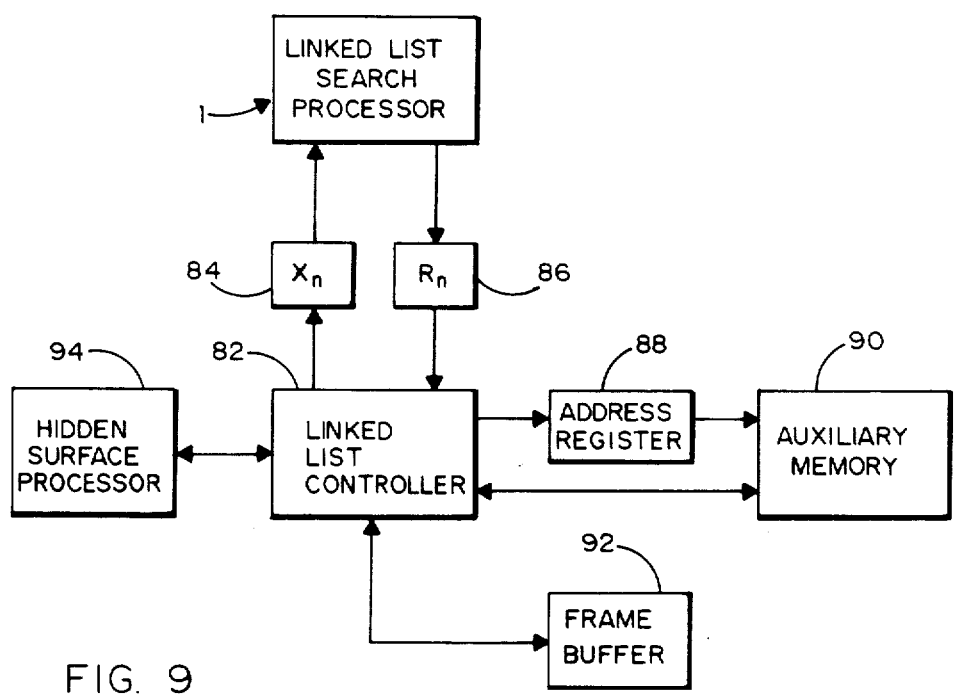
FIG. 9 is a block diagram to illustrate a portion of a computer graphics system in which the present linked list search processor can be interconnected.

FIG. 9 of the drawings is a block diagram representing a portion of a computer graphics or computer generated imagery system into which the linked list search processor 1 of the present invention is interconnected. The operation of the linked list search processor 1 is controlled by a high speed linked list controller or processor 82. Linked list controller 82 is preferably a 2901 bit slice processor, such as that manufactured by AMD Corporation. Controller 82 supplies data to search processor 1 by way of an input register 84. Input register 84 provides a signal to search processor 1 that is indicative of the nine bit input search argument ($K_0$–$K_8$) for the new data entry to be inserted into the list. Search processor 1 supplies data to the linked list controller 82 by way of an output register 86. Output register 86 provides a signal to controller 82 that is indicative of the resultant nine bit data set ($R_0$–$R_8$) at the output terminals of search processor 1 in response to the input search argument.

Figure 10:
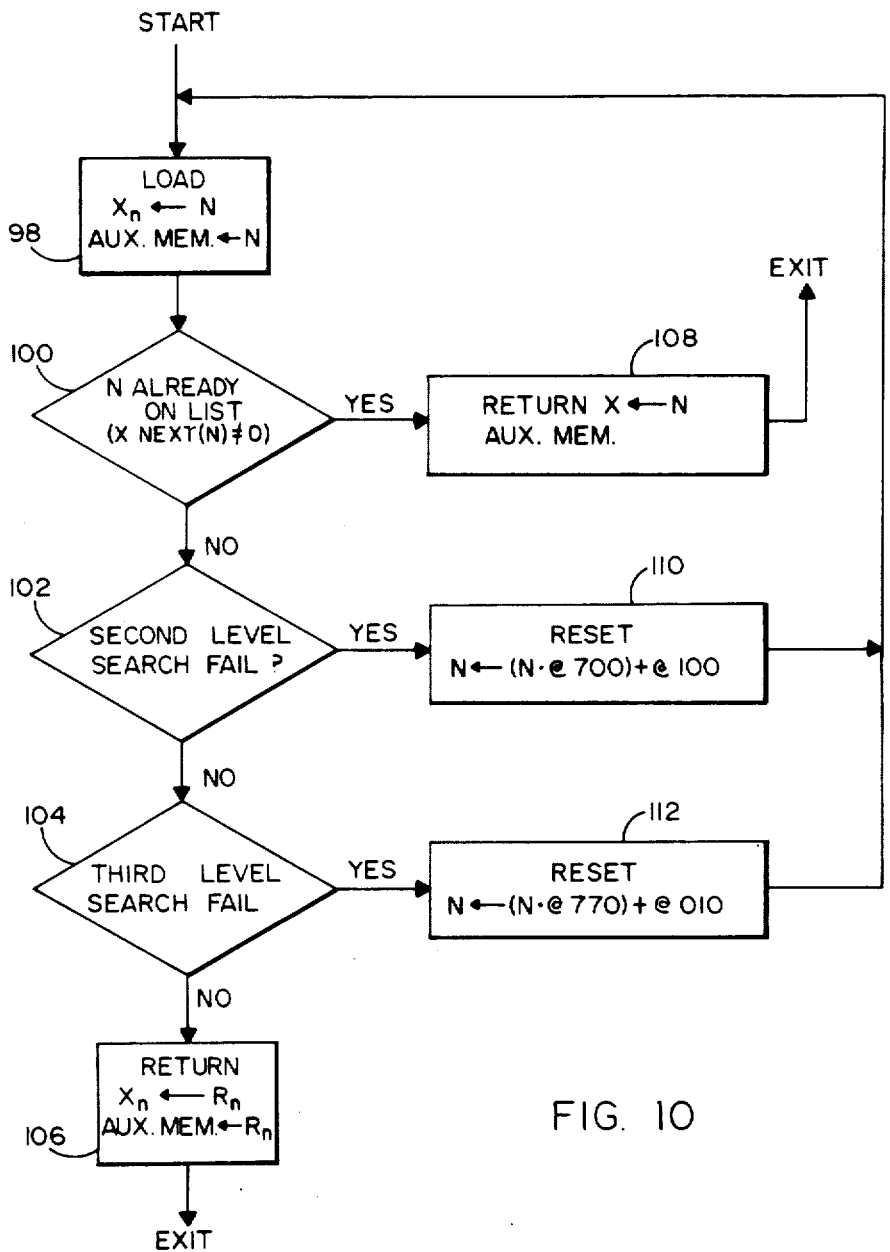
FIG. 10 is a flow chart illustrative of a computer program for controlling the operation of the linked list search processor of the present invention.

The operation of linked list controller 82 is directed by a suitable software listing, a flow chart of which is illustrated in FIG. 10 of the drawings. In this regard, controller 82 is adapted to augment the input search argument during a search of the linked list in the event of a condition such as that described during the third search case and illustrated in FIG. 7. Moreover, controller 80 is adapted to either change or assign pointers (designated P in FIG. 1) to the stored scan line segment data depending upon the output of the linked list processor in response to an input search argument, so as to permit data regarding a complete scan line to be sequentially assembled and displayed.

Linked list controller 82 supplies data to an auxiliary memory 90 by way of an address register 88. Auxiliary memory 90 is preferably a plurality of memory units which perform multiple functions including that of a conventional random access memory. Auxiliary memory 90 contains a duplication of the data items that are stored in the linked list. As previously disclosed, only information relating to the magnitudes of the starting coordinates of the segments of a scan line is stored in a linked list and scanned during a search. Therefore, additional information (e.g. the length, polygon number and Z coordinate) relating to previously read scan line segment data items is stored in auxilry memory 90. Hence, the nine bit search argument of any item stored in the linked list also corresponds to the location in auxiliary memory 90 where such additional information is located. Address register 88 monitors the location in auxiliary memory 90 at which each string of additional binary information relating to a scan line segment is stored. What is more, auxiliary memory 90 determines whether a new data entry is already stored in the linked list of existing data items. If the new data entry is currently in the list, then a search of the list is avoided. If the new data entry is not in the linked list and a search of the list is completed, auxiliary memory 90 determines the data item in the list which follows the newly inserted data entry so that pointers may be properly established by controller 82 to link the items of the list in a fashion similar to that depicted in FIG. 1.

Linked list controller 82 also communicates with a well-known frame buffer 92. Frame buffer 92 stores information corresponding to a plurality of completed scan lines to permit such scan lines to be assembled and a picture displayed.

Linked list controller 82 is also connected to a commercially available bit slice or hidden surface processor 94 fabricated so as to implement a hidden surface algorithm, such as that known in the art as the Watkins algorithm (U.S. Pat. No. 3,736,564), whereby to receive and transfer data by which to assemble a complete video scan line. The hidden surface processor 94 is adapted to start a search of a linked list and cause the new data entry to be selectively inserted into the list according to the magnitude thereof. Information regarding the magnitude of the current, previous and next data entry to the linked list is also stored in hidden surface processor 94. Moreover, hidden surface processor 94 is capable of deleting an entry which is stored in the linked list and initializing the linked list to receive a new set of data entries indicative of a different scan line. Included in hidden surface processor 94 is a temporary memory (not shown). Information relating to a new scan line segment, other than the magnitude of the starting coordinate thereof, is stored in such temporary memory until a search of the linked list has been completed. Once the search has been completed and the scan line starting coordinate properly inserted into the linked list, any other information relating to the new scan line segment is transferred to the auxiliary memory 90 from the temporary memory of processor 94 by way of controller 82, so as to permit data regarding a complete video scan line to be ultimately assembled and displayed.

As previously indicated, the operation of the linked list controller 82 is directed by a software listing. Although such software listing is not essential to an understanding of the claimed invention, a flow chart thereof is provided in FIG. 10, so that a brief description can be provided of a suitable program by which to regulate the operation of controller 82. The hereinbelow described program would typically by in microcode format and consist of a subroutine of a longer program.

Briefly, and in general terms, the preferred computer program is adapted to control the performance of certain tasks, including reading binary signals corresponding to both the input data entry search argument ($K_0$–$K_8$) and the output resultant field ($R_0$–$R_8$) and supplying such signals to and from the linked list search processor. The program also manipulates certain control signals so as to set, clear and initialize data bits which are stored in the first, second and third search level memories, as earlier described when referring to FIG. 8. What is more, the program causes the search operation to be monitored so that the input search argument can be augmented in the special third case, as earlier described when referring to FIG. 7.

More particularly, and referring concurrently to FIGS. 9 and 10 of the drawings, N (in FIG. 10) represents the input search argument ($K_0$–$K_8$) corresponding to a new data entry to be added to the linked list, and X (also in FIG. 10) represents the output ($R_0$–$R_8$) of linked list search processor 1 which, as previously disclosed, provides the magnitude of the largest item in the linked list, such that $X \leq N$. Initially (at 98), the input search argument is loaded into each of the input register 84 and address register 88. Auxiliary memory 90 is accessed (at 100) to determine if the new data entry is already stored in the linked list. If the new data entry is in the list, then the auxiliary memory 90 provides a corresponding indication, and an exit from the subroutine is made (at 108). If the new data entry is not already in the list, then first, second and third level searches of the linked list are conducted on the basis of the magnitude of the input search argument.

In the event (at 102) that the second level search fails (i.e. in a manner as previously described while referring to FIG. 7), then the three most significant bits of the input search argument are augmented by a binary 1 and each of the remaining six bits is set to a binary 0 (shown in octal notation at 110). Hence, new first and second level searches are conducted on the basis of the transformed search argument. In the event that the third level search fails (at 104), the first six most significant bits of the input search argument are augmented by a binary 1 and each of the remaining three bits is set to a binary 0 (shown in octal notation at 112). Hence, new first, second and third level searches are conducted on the basis of the transformed search argument.

In the event that neither the second nor third level searches fail, the output resultant field of linked list search processor 1 is loaded into output register 86 (at 106). Moreover, the output of search processor 1 is supplied to address register 88, so that information can be obtained from auxiliary memory 90 to permit the new data entry to be properly inserted into the linked list and pointers suitably established. The subroutine is then concluded and an exit is made therefrom.

It will be apparent that while a preferred embodiment of the present invention has been shown and described, various modifications and changes may be made without departing from the true spirit and scope of the invention. For example, for an input search argument of magnitude X, the output signal ($R_0$–$R_8$) of the linked list search processor 1 of the present invention has heretofor been described as the largest item $X_L$ in the linked list, such that $X_L < X$. However, and without any intended limitation, it is to be understood that the output signal of seach processor 1 can also provide the smallest item $X_s$ in the list, such that $X_s > X$. The foregoing can be accomplished by inverting the input search argument, such as by deleting (from FIG. 8) both the input and output inverters 52 and 76 from first, second and third search processor modules (2, 12 and 20).

Having thus set forth the preferred embodiment of the present invention, what is claimed is:

1. A high speed search processor for rapidly searching a plurality of data items which are listed in order of magnitude and for identifying a location in the list at which to insert a new data entry depending upon the magnitude of the new data entry relative to the magnitudes of the data items in the list, said search processor having at least one search level, said search level comprising:

memory means in which to store information representative of the data items in the list and into which the new data entry is to be encoded, and search means interconnected with said memory means for accessing the information stored therein, said search means receiving from an input register an input signal which is representative of both the magnitude of the new data entry and the location in the list at which said new data entry is to be inserted and supplying an output signal which is representative of a particular data item in the list having either the largest magnitude of any data item in the list, such that the magnitude of said particular data item is less than the magnitude of the new data entry to be inserted into the list of the smallest magnitude of any data item in the list, such that the magnitude of said particular data item is greater then the magnitude of the new data entry to be inserted into the list, said search means including:

a plurality of setting and clearing stages for setting or clearing respective bits of information stored in said memory means, each setting and clearing stage connected between output terminal means of said memory means to receive a bit of information stored therein and input terminal means of said memory means to supply thereto a signal by which to set or clear said bit depending upon the logic level thereof.

decoder means connected to receive from said input register the input signal to said search means and to supply decoder output signals to said plurality of setting and clearing stages, which output signals are representative of said input signal so that a particular one of said setting and clearing stages can be activated for setting or clearing a respective bit of information depending upon the output signals from said decoder means and the logic level of said bit of information, and masking means interconnected with said decoder means and said memory means for masking certain bits of information in said memory means depending upon the output signals supplied by said decoder means.

2. The search processor recited in claim 1, comprising a plurality of said search levels connected together in a serial data path, each search level including a memory means in which to store information representative of the data items in the list and a search means interconnected with said memory means for accessing the information stored therein, each search level search means receiving from said input register a search argument input signal which is representative of said new data entry and supplying an output signal which is representative of a particular data item in the list of data items in response to the magnitude of the new data entry.

3. The search processor recited in claim 2, further comprising multiplexer means connected between the search means of a preceeding one of said plurality of search levels and the memory means of a succeeding one of said plurality of search levels, said multiplexer means receiving the output signal from a respectively connected seach means and controlling the transmission of said output signal to a respectively connected memory means.

4. The search processor recited in claim 1, wherein said search means further comprises additional multiplexer means connected between said plurality of setting and clearing stages and the input terminal means of said memory means, said multiplexer means controlling the transmission of a signal from one of said setting and clearing stages to said memory means so as to permit a particular bit of information stored therein to be selectively set or cleared.

5. The search processor recited in claim 1, wherein said search means also includes encoder means interconnected with said memory means and said masking means and responsive to the bits of information which are stored in said memory means and not masked by said masking means, said encoder means providing an output signal that is indicative of the location in said memory means of a certain one of said unmasked bits.

6. The search processor recited in claim 5, wherein said search means further comprises an array of signal gating means providing output signals to said encoder means for controlling the operation thereof, each of said signal gating means from the array thereof receiving an input signal from said memory means, which input signal is indicative of a respective bit of information regarding at least one data item in the list of data items, and, the output signals from said array of signal gating means being dependent upon the output of said decoder means.

7. The search processor recited in claim 5, wherein said masking means includes a serial chain of signal gating means connected between said decoder means and said encoder means, output signals of respective ones of said chain of signal gating means controlling the operation of said encoder means depending upon the output of said decoder means.

8. The search processor recited in claim 1, wherein each of said setting and clearing stages is connected to said decoder means and includes first and second signal gating means, the output signal from a first signal gating means acting to set a particular bit of information in said memory means, and the output signal from the second signal gating means acting to clear a particular bit of information in said memory means.

9. The search processor recited in claim 8, wherein each of said first and second signal gating means has at least two input terminals,
   one input terminal of each of said signal gating means connected together to receive a particular bit of information stored in said memory means,
   the second input terminal of each of said signal gating means connected to receive an output signal from said decoder means, and
   said decoder means output signal being supplied to the second input terminal of said first signal gating means by way of an inverter.

10. The search processor recited in claim 1, wherein said data items in the list thereof correspond to information regarding respective scan line segments of a video image, which scan line segments are assembled in order of magnitude thereof to form a scan line.

* * * * *